United States Patent [19]

Danieli et al.

[11] Patent Number: 5,377,561
[45] Date of Patent: Jan. 3, 1995

[54] DEVICE FOR FIXING A SHOE TO A BICYCLE PEDAL

[75] Inventors: Diego Danieli; Angelo Mason, both of Caerano San Marco, Italy

[73] Assignee: Diadora S.p.A., Caerano San Marco, Italy

[21] Appl. No.: 937,019

[22] Filed: Aug. 31, 1992

[30] Foreign Application Priority Data

Sep. 10, 1991 [IT] Italy ................. 91A000153
Nov. 12, 1991 [IT] Italy ................. 91U000105

[51] Int. Cl.⁶ ................. G05G 1/14; A43B 5/00
[52] U.S. Cl. ................. 74/594.6; 74/594.4; 36/131
[58] Field of Search ................. 74/594.6, 594.4; 36/131, 132

[56] References Cited

U.S. PATENT DOCUMENTS

| | | | |
|---|---|---|---|
| 4,928,549 | 5/1990 | Nagano | 74/594.6 |
| 4,947,708 | 8/1990 | Lacombe | 74/594.6 |
| 5,014,571 | 5/1991 | Dapezi | 74/594.6 |
| 5,105,683 | 4/1992 | Mercat et al. | 74/594.4 X |
| 5,142,938 | 9/1992 | Sampson | 36/131 |

FOREIGN PATENT DOCUMENTS

| | | | |
|---|---|---|---|
| 0146454 | 6/1985 | European Pat. Off. | 74/594.6 |
| 0293340 | 11/1988 | European Pat. Off. | 74/594.6 |
| 0359134 | 3/1990 | European Pat. Off. | 74/594.6 |
| 0424210 | 4/1991 | European Pat. Off. | 74/594.6 |
| 0428140 | 5/1991 | European Pat. Off. | 74/594.6 |
| 2609270 | 7/1988 | France | 74/594.6 |
| 3329993 | 3/1985 | Germany | 74/594.6 |
| 3924601 | 1/1991 | Germany | 74/594.6 |
| 8806315 | 8/1988 | WIPO | 74/594.6 |

*Primary Examiner*—Vinh T. Luong
*Attorney, Agent, or Firm*—Guido Modiano; Albert Josif; Daniel O'Byrne

[57] ABSTRACT

The device for fixing a shoe to a bicycle pedal includes a plate which is fixed to the sole of the shoe and which has a front wing and a rear wing for the engagement of coupling elements which are associated with the pedal, the coupling elements being respectively constituted by a front fixed coupling element and by a rear movable coupling element which is biased forward by an elastic element in which a rotation of the sole about an axis perpendicular thereto causes the backward movement of the movable coupling element and its lateral disengagement from the pedal, due to the engagement of an inclined surface of a tooth of the rear wing with a corresponding inclined surface of the movable coupling element, and thereby the rear movable coupling element can slide in a straight line in a direction which is at right angles to the rotation axis of the pedal.

15 Claims, 4 Drawing Sheets

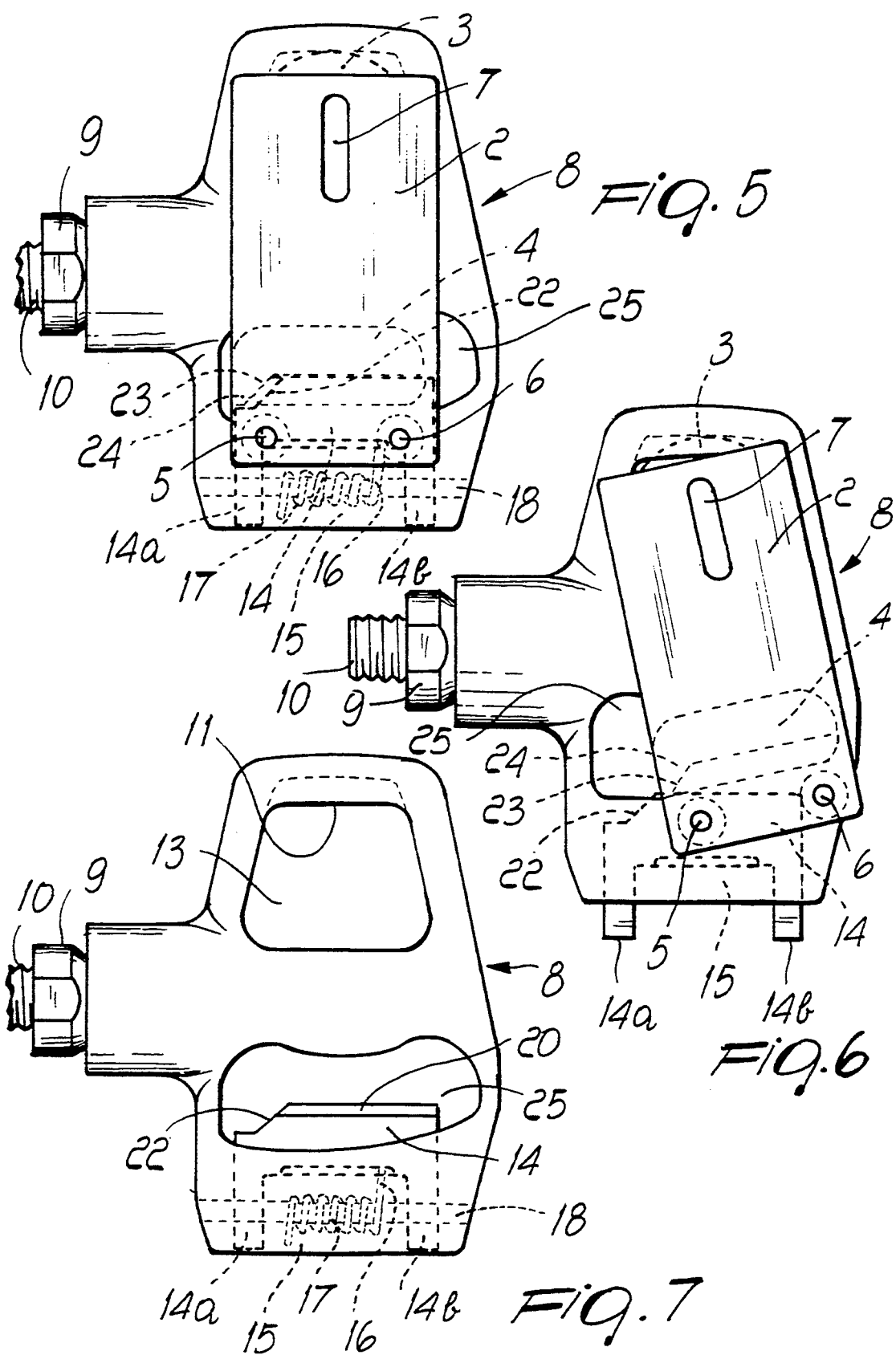

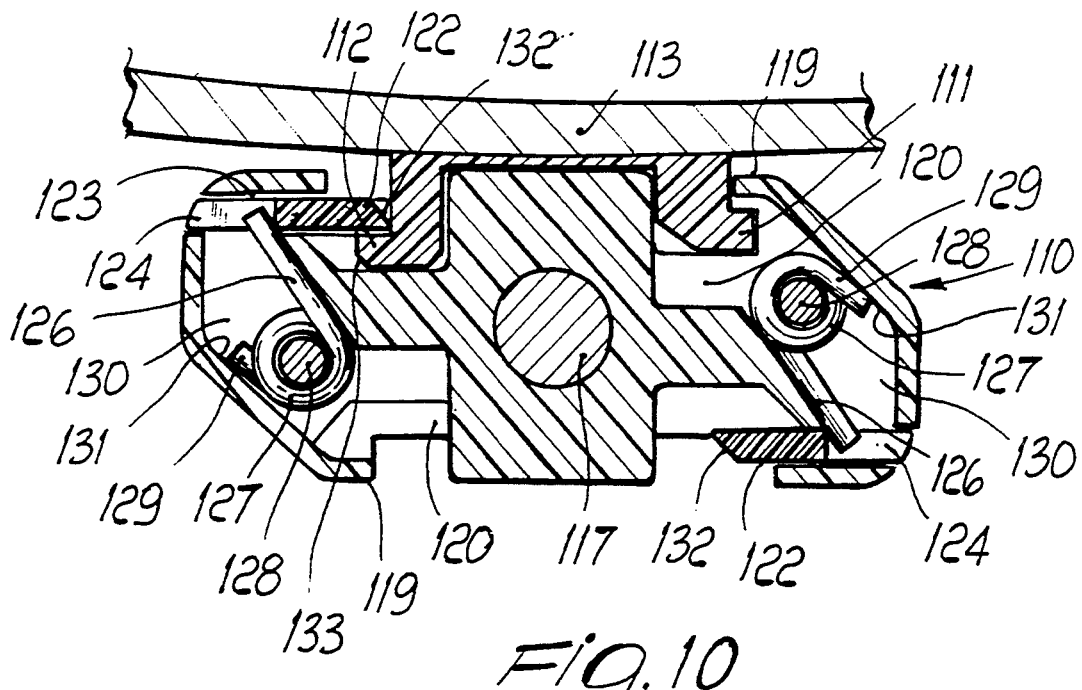
Fig. 10
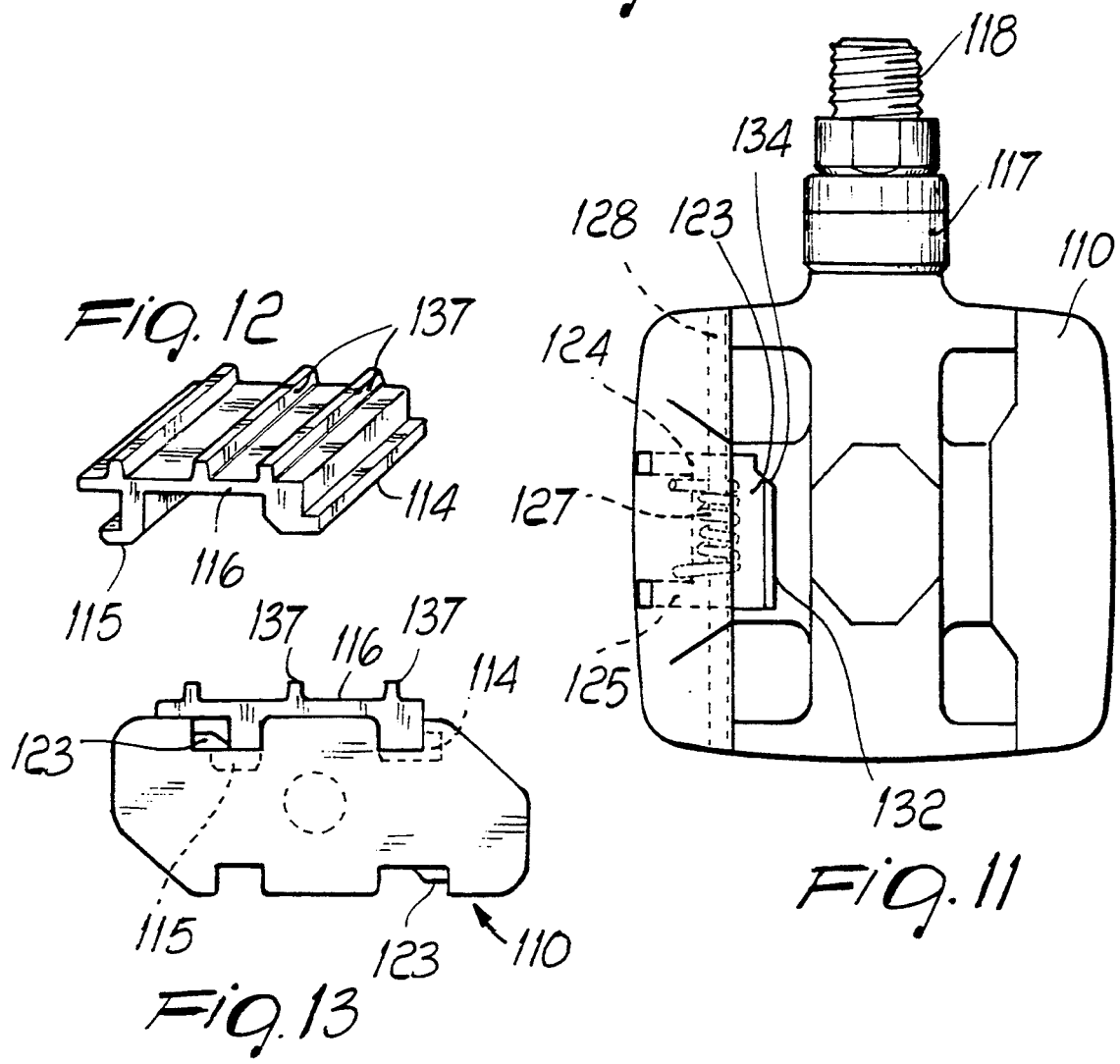
Fig. 12
Fig. 11
Fig. 13

DEVICE FOR FIXING A SHOE TO A BICYCLE PEDAL

BACKGROUND OF THE INVENTION

The present invention relates to a device for fixing a shoe to a bicycle pedal.

It is known that cyclists need to stably fix their feet to the pedals, especially in competition, in order to be able to apply the driving action in the best way.

Conventional toe clips with straps are currently being superseded by fixing devices which can be coupled and released without manual intervention.

This is done in order to make coupling, but especially release, easier and quicker, and to avoid the danger of falls in those cases in which it is necessary to place one foot on the ground in a very short time.

Fixing devices with automatic coupling and release also have the advantage that they do not act on the upper part of the foot, as occurred in toe clips with straps, but act on the sole instead, and that they do not limit the conditions of comfort of the foot in the shoe.

Among fixing devices with automatic coupling and release, one type comprises a plate, to be fixed to the sole of the shoe, which is provided, at the front and at the rear, with engagement wings for coupling means which are associated with the pedal.

Said coupling means are constituted respectively by a front fixed coupling element and by a rear movable coupling element which is pushed forward by a spring.

Coupling occurs by inserting the front wing in the fixed coupling and by then pressing the rear wing downward onto the movable coupling element, which is conveniently provided with a chamfer which is suitable to constitute an inclined plane which divides the pressure into two components, one of which is in a backward direction and causes snap-together coupling by contrasting the action of elastic means.

The parts are shaped so that a rotation of the plate about its position causes the backward movement of the movable coupling element and its lateral disengagement from the pedal.

However, this type of device is affected by a problem which is due to the fact that the rear movable coupling element is in practice constituted by a lever on which the elastic means are located between the fulcrum point and the anchoring point.

This entails that a considerable effort is necessary in order to produce such a counter-thrust component as to allow coupling.

Other problems are due to the fact that the foot, during pedaling, does not arrange itself flat, i.e. parallel to the ground, but it is raised in the heel region by approximately 4-5 centimeters.

Currently commercially available automatic pedals are flat.

In order to compensate for the difference in level between the foot during pedaling and the flat pedal, shoe manufacturers must produce soles which are thicker in the heel region.

This entails a further increase in weight and in the spacing of the foot from the resting point on the pedal, with a resultant loss of sensitivity during pushing.

It should be furthermore noted that automatic fixing devices are currently manufactured for pedals which are particularly suitable for road bicycles, for which the need to remove the foot from the pedal occurs rather infrequently.

For bicycles which are used in particular on rough terrain, such as those for cross-country riding or mountain bikes, there is a series of requirements which current pedals and couplings have so far failed to meet.

In particular, first of all, the pedal must be stably fixed to the shoe during pedaling; secondly, due to the fact that the feet must be frequently removed from the pedal, when recoupling occurs said pedal must be in an optimum position for rapid fixing, which must in any case be performed without the aid of the hands.

SUMMARY OF THE INVENTION

The main aim of the present invention is to provide a device for fixing a shoe to a bicycle pedal which eliminates the problems described above in known types.

A consequent primary object is to provide a fixing device which has a soft, easy and safe coupling.

Another important object is to provide a fixing device which adapts to the shapes and positions of the shoe during pedaling, so that the shims currently used on soles can be eliminated, thus making them lighter, and so that the pedaling action is more uniform.

Another important object is to provide a fixing device which does not have greater constructive difficulties than current ones.

Another object is to provide a bicycle pedal and fixing device which is particularly suitable for multiple couplings and releases.

Another object is to provide a bicycle pedal and fixing device in which the coupling of the shoe to the pedal occurs without the aid of one's hands.

Not least object is to provide a fixing device and a pedal which can be manufactured with conventional equipment and facilities.

This aim, these objects and others which will become apparent hereinafter are achieved by a device for fixing a shoe to a bicycle pedal, comprising a plate which is fixable to a sole of the shoe, said plate being provided with a front wing and with a rear wing, both of which are provided for the engagement of coupling means which are associated with the pedal and which comprise a front fixed coupling element and a rear movable coupling element which is biased forward by elastic means, said device being characterized in that said rear movable coupling element is retained to said pedal so that it can slide in a straight line in a direction which is at right angles to the rotation axis of said pedal.

BRIEF DESCRIPTION OF THE DRAWINGS

Further characteristics and advantages of the invention will become apparent from the detailed description of some embodiments thereof, illustrated only by way of non-limitative example in the accompanying drawings, wherein:

FIG. 5 is a top view of the complete fixing device, with the parts coupled;

FIG. 6 is a top view of the complete fixing device, during the release movement;

FIG. 7 is a bottom view of the part of the device which is associated with the pedal;

FIG. 10 is a schematic longitudinal sectional view of the pedal of FIGS. 8 and 9 with the sole coupled;

FIG. 11 is a top view of the pedal of FIGS. 8, 9 and 10;

FIG. 12 is a perspective view of a covering plate which can be coupled to the pedal of FIGS. 8 to 11;

FIG. 13 is a front view of the pedal with the plate of FIG. 12 coupled.

DESCRIPTION OF THE PREFERRED EMBODIMENTS

Figure 1:
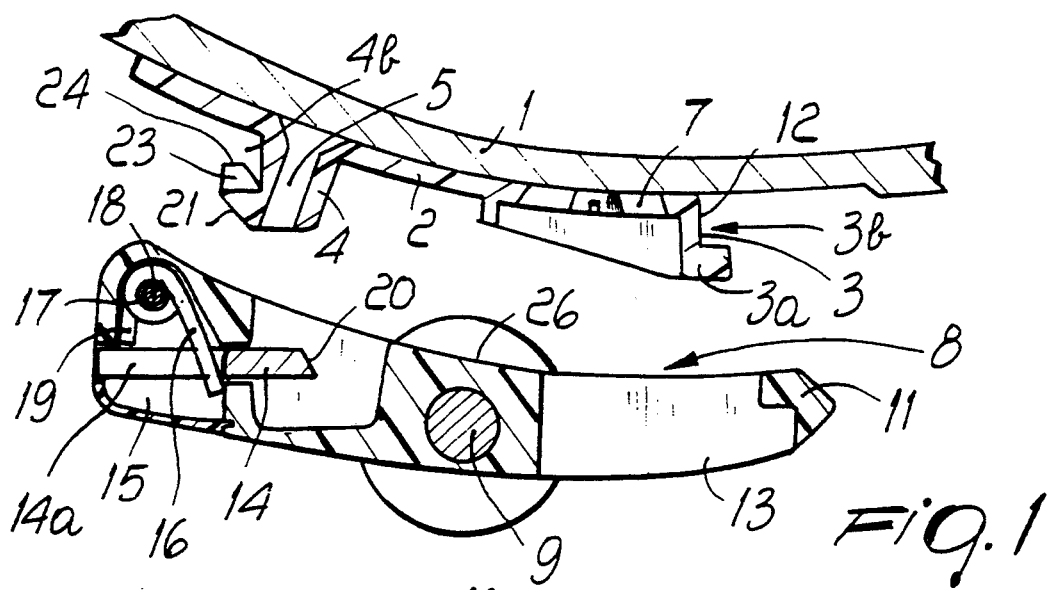
FIG. 1 is a schematic longitudinal sectional view of an embodiment of the fixing device according to the invention, with the parts uncoupled.

With reference to the above FIGS. 1 to 7, a device for fixing a shoe to a bicycle pedal according to the invention comprises a shaped plate 2 which is rigidly fixable to the sole 1 of the shoe and which is provided with two wings, respectively a front one 3 and a rear one 4; the first wing is rounded and provided, in a downward position, with a forward-protruding portion 3a which defines a recess 3b between the portion itself and the sole 1; the second wing defines, to the rear and in its upper part, a transverse recess 4b.

The plate 2 is provided with circular and slotted holes, respectively 5, 6 and 7, for accommodating screws for fixing the plate to the sole, which are designated by the same reference numerals.

Said wings 3 and 4 are suitable to engage coupling means which are associated with a pedal 8, which in a conventional manner, can conveniently rotate about a rotation pivot 9 thereof which, according to the known art, has a threaded end 10 to be screwed laterally to a respective pedal crank which is not illustrated.

In particular, the coupling means associated with the pedal 8 comprise a fixed forward coupling element 11, which extends at the front directly from said pedal 8 and which is curved backward so as to enter the recess 3b defined between the wing 3 and the sole 1.

The region 12 of the wing 3, which is suitable to rest frontally against the front part of the pedal 8, is shaped (i.e. curved) so as to allow rotations of the sole 1 about its own position (i.e. about an axis substantially perpendicular to the sole).

Naturally, said pedal 8 has a seat 13 within which the entire wing 3 is accommodated once coupling has occurred, and said seat 13 is wide so as to allow the above mentioned rotations.

Said coupling means associated with the pedal 8 furthermore comprises a rear movable coupling element which is constituted by a slider 14 which is retained so that it slides transversely with respect to the rotation axis of the pedal 8 in a seat 15 which is defined by a rear shaping thereof.

Conveniently, said slider 14 is provided with parallel guiding wings, respectively 14a and 14b, which are slidingly guided on the side walls of the seat 15.

Said slider 14 is biased forward by a radial end 16 of a cylindrical helical spring which surrounds a pivot 18 which is parallel to the rotation pivot 9 and is inserted in a corresponding hole of the pedal 8; the other radial end 19 and said spring 17 abuts against the rear wall of the seat 15.

Said slider 14 is flat and is provided, in an upward front position, with a transverse chamfer 20 for the resting of a corresponding chamfer 21 which is provided on the wing 4 and which constitutes an inclined plane which is suitable to facilitate coupling.

The chamfer 20 produces, by means of a downward pressure of the wing 4, a force component which is suitable to move the slider 14 backward, contrasting the action of the spring 17, until it engages the recess 4b.

Said slider 14 is laterally provided, on the side which is directed inwardly and forwardly, with a lateral chamfer 22 which, upon coupling, makes contact with a respective inclined side wall 23 of a tooth 24 which extends upwardly, inside the recess 4b, from the wing 4.

Naturally, said pedal 8 has a wide seat 25 inside which the entire wing 4 is accommodated.

In this manner, a rotation of the sole 1 about the pivoting point defined by the fixed resting element 11 produces a thrust component between the wall 23 and the corresponding chamfer 22 which causes the backward movement of the slider 14 and thus the possibility of disengaging the wing 4 and consequently the wing 3.

Figure 2:
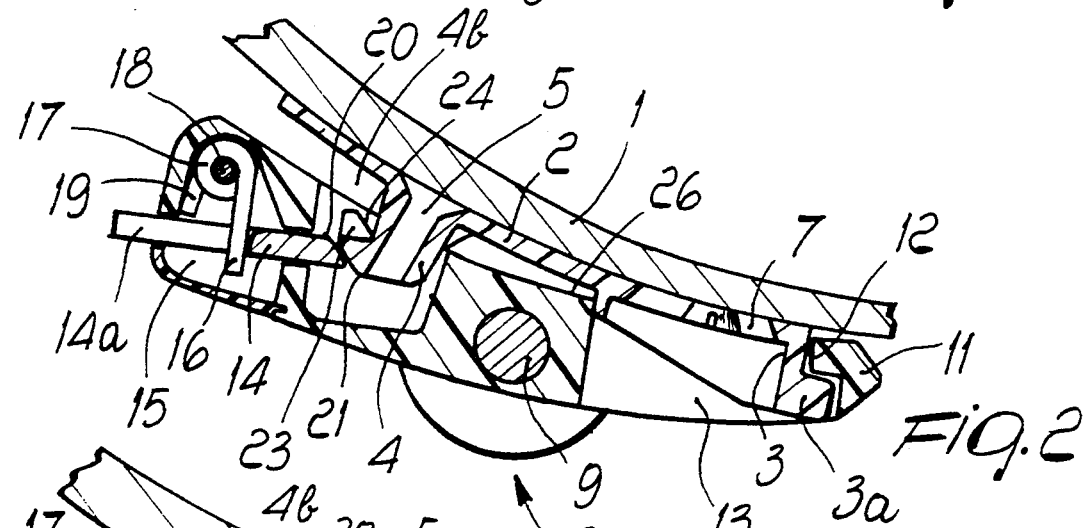
FIG. 2 is a longitudinal sectional view of the fixing device during the mutual coupling of the parts.
Figure 3:
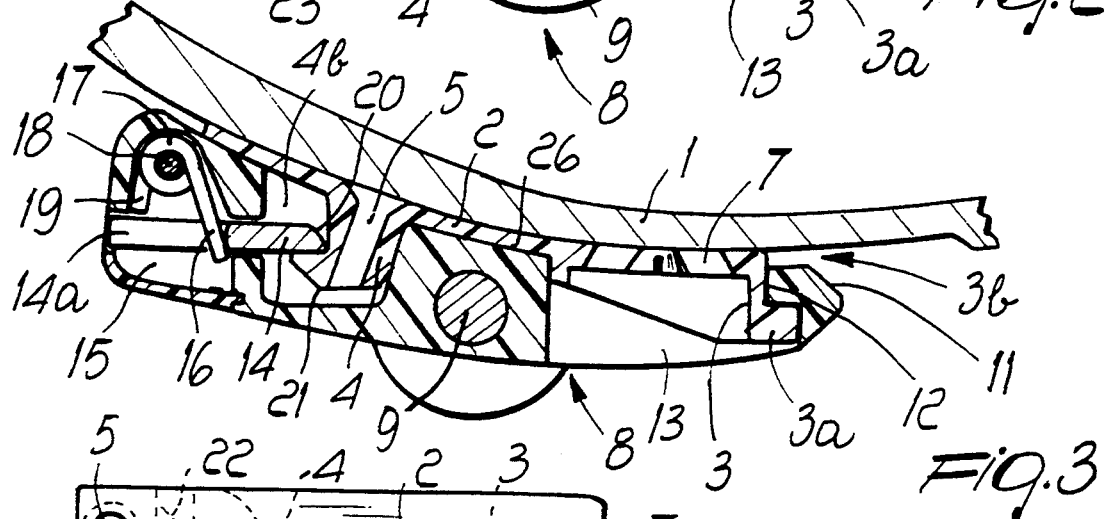
FIG. 3 is a longitudinal sectional view of the fixing device with the parts coupled.
Figure 4:
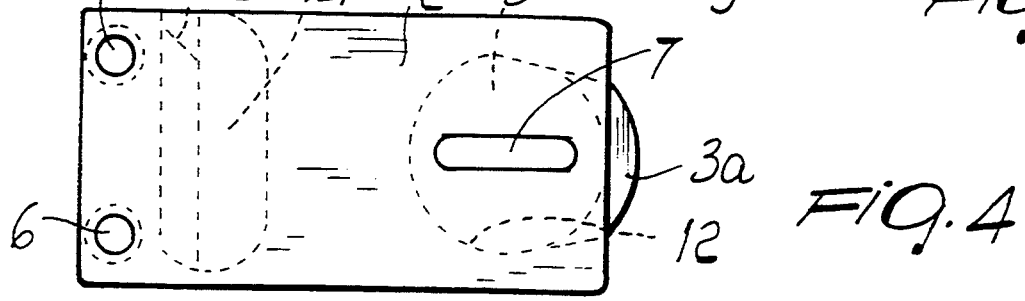
FIG. 4 is a top view of the part of the fixing device which is associated with the pedal.
Figure 8:
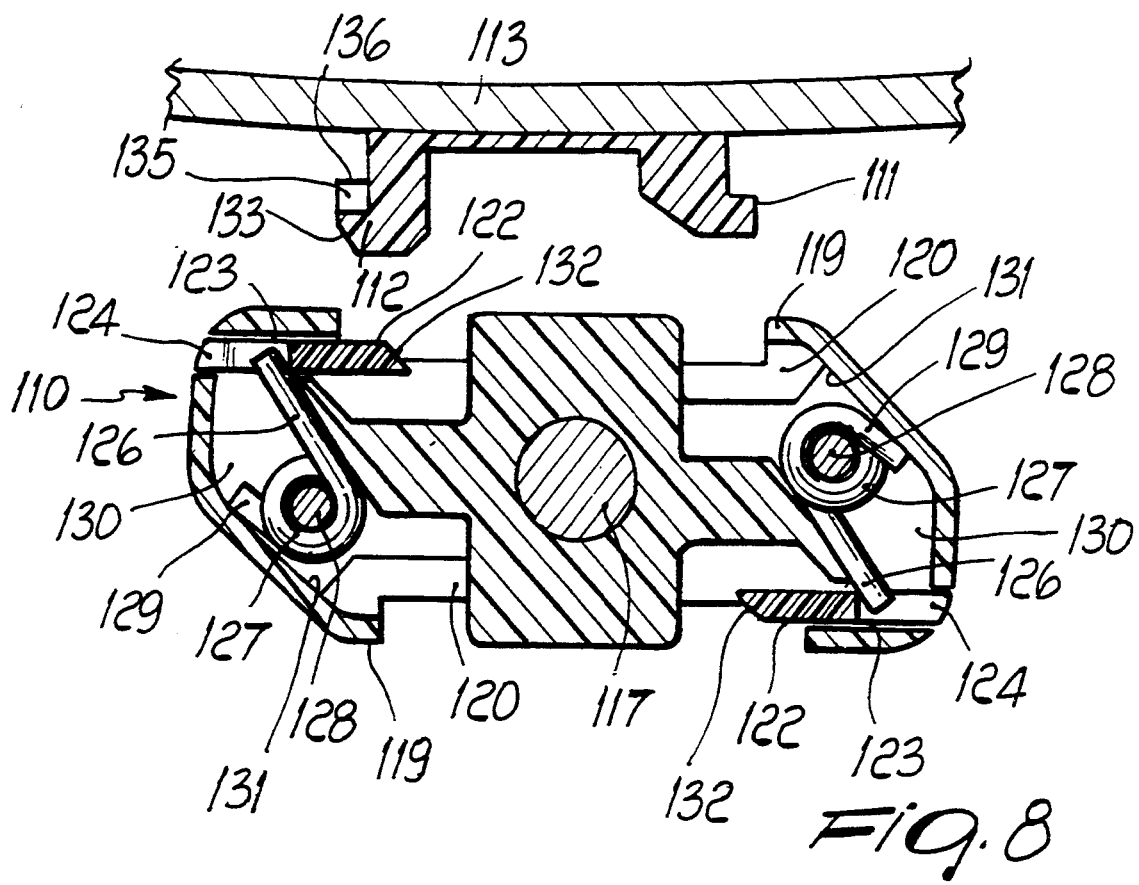
FIG. 8 is a schematic longitudinal sectional view of a variated embodiment of the pedal, in the position wherein it is uncoupled from hook-like wings which extend from the sole of a shoe.
Figure 9:
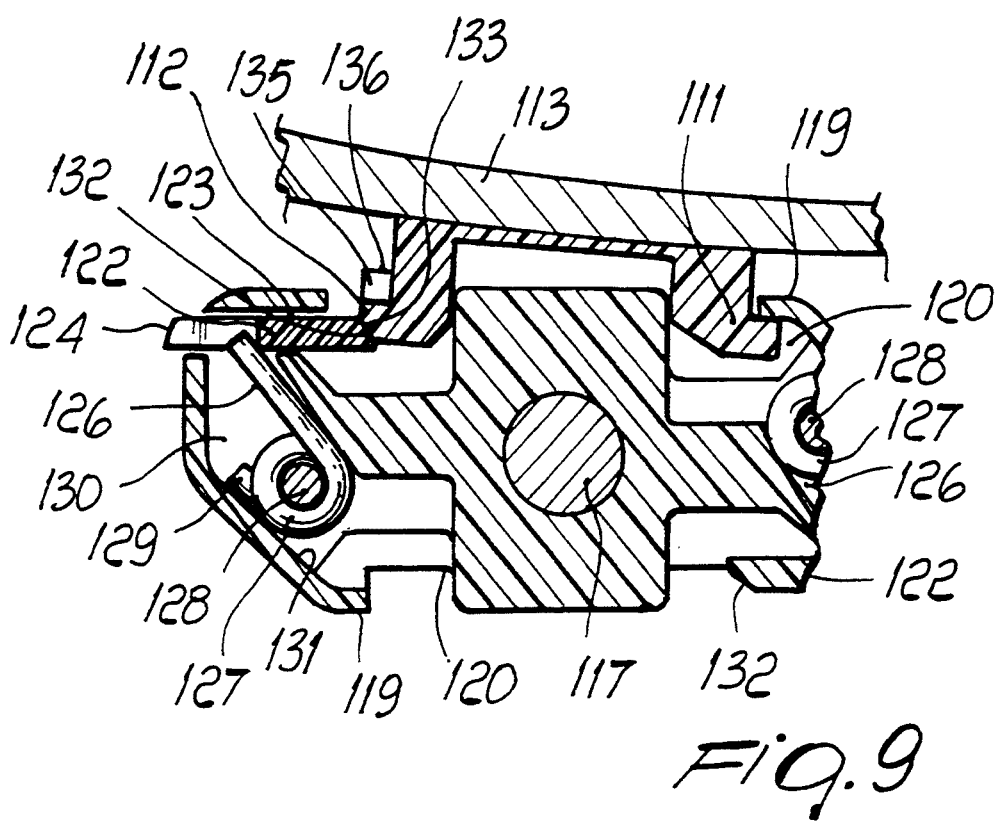
FIG. 9 is a schematic longitudinal sectional view of the step of the coupling between the sole and the pedal according to the variated embodiment.

It should be furthermore stressed that, as illustrated in FIGS. 1 to 3, the curved surface defined by the upper portion 26 of the pedal 8 is accurately shaped complementarily to the corresponding region of 2 and is suitable to constitute a resting region after coupling.

The operation of the fixing device according to the invention, which can be inferred from what has been described above, comprises a first step, during which the wing 3 is coupled to the fixed element 11, and a second step, during which a downward pressure is exerted, resting the chamfer 21 of the wing 4 on the chamfer 20 of the slider 14.

In this manner, the slider 14 is pushed backwards, allowing coupling between said slider and the wing 4.

In practice it has thus been observed that the presence of the slider 14 which couples by translatory motion makes the coupling action softer, easier and safer than the types known in the state of the art.

The shape of the coupling device, and consequently of the pedal assembly, is curved so as to adapt to the shape of the sole and to the optimum position of the foot during pedaling.

With reference now to the above FIGS. 8 to 13, in a constructive variation a pedal is generally designated by the reference numeral 110 and, according to the invention, comprises, at the two foot resting regions on opposite sides of the pedal, respective coupling means which, as the pedal turns, assume a position suitable to engage hook-like wings, respectively a front one 111 and a rear one 112, which extend from the sole 113 of a shoe, or in other cases assume a position suitable to engage hooklike wings 114 and 115 which extend from a covering plate 116.

Conveniently, said coupling means are in opposite positions with respect to the rotation pivot 117 of the pedal which, according to a per se known method, has a threaded end 118 to be screwed laterally to a corresponding pedal crank which is not illustrated.

The coupling means comprise a fixed coupling element 119 (provided at both sides of the pedal) which extends at the front and is curved backwardly so as to enter the recess defined between the wing 111, which is appropriately directed forwardly, and the sole 113.

Naturally, said pedal 110 has a seat 120 inside which the entire wing 111 is accommodated once coupling has occurred.

The coupling means furthermore comprise a rear movable coupling element which is constituted by a slider 122 which is retained so that it slides transversely with respect to the rotation axis of the pedal 111 inside a seat 123 defined by a rear shaping of said pedal.

Conveniently, said slider 122 is provided with parallel guiding wings, respectively 124 and 125, which are slidingly guided on the side walls of the seat 115 and which are suitable to protrude from corresponding holes which are provided on the outer wall of the pedal 110.

Said slider 122 is biased forward by a radial end 126 of a cylindrical helical spring 127 which surrounds a pivot 128 which is parallel to the rotation pivot 117 and is inserted in a corresponding hole of the pedal 110.

The other radial end 129 of said spring 127 rests against the rear wall of its seat 130.

It should be stressed that the shape of the pedal 110 is such that the seat 120 of one of the coupling means and the seat 123 of the other one of said coupling means are connected by means of the seat 130.

The thrusting action of the spring 127 is limited by a wall 131 against which the radial end 126 abuts.

Said slider 122 is flat and is provided, at the front and upwardly, with a transverse chamfer 132 for the resting of a corresponding chamfer 133 which is present on the hook-like wing 112 and which constitutes an inclined plane which is suitable to facilitate coupling.

The chamfer 132 produces, upon a downward pressure of the wing 112, a force component which is suitable to move the slider 122 backward, overcoming the action of the spring 127, until said slider engages the recess defined at the rear between said wing and the sole 113.

Said slider 122 is provided, laterally and at the front, with a lateral chamfer 134 which, upon coupling, makes contact with a respective inclined side wall 135 of a tooth 136 which extends upward from the end of the wing 112.

Naturally, said seat 123 is shaped so as to accommodate the entire wing 112 in addition to the slider 122.

In this manner, a rotation of the sole 113, by pivoting on the fixed coupling element 119, produces a thrust component between the wall 135 and the corresponding chamfer 134 which moves the slider 122 backward and thus allows to disengage the wing 112 and consequently the wing 111 and the sole 113.

As already mentioned above, if at least one pedal resting region is to be converted into a conventional resting region without couplings, a covering plate 116, conveniently provided with coupling wings 114 and 115 which are equivalent to the preceding ones 111 and 112, can be appropriately fixed to the pedal 110.

The plate 116 is conveniently provided with transverse ridges 137 suitable to improve grip.

The pedal is furthermore provided with double coupling means which are arranged at both of the regions where the foot rests for pedaling.

This makes coupling particularly easy especially for those uses which require frequent couplings and releases.

The coupling action is soft, easy and safe and can be performed without using one's hands.

In practice it has thus been observed that the intended aim and objects of the present invention have been achieved.

The invention thus conceived is susceptible to numerous modifications and variations, all of which are within the scope of the inventive concept.

All the details may furthermore be replaced with other technically equivalent elements.

In practice, the materials employed, so long as they are compatible with the contingent use, as well as the dimensions, may be any according to the requirements.

We claim:

1. In combination, a bicycle pedal (8) having a rotation axis, a shoe having a sole (1), and a device for fixing said sole (1) of said shoe to said bicycle pedal (8), said device comprising a plate (2) fixed to said sole (1), a front fixed coupling element (11) connected to said pedal (8), a guiding seat (15) defined in said pedal (8) and having a rear wall, a rear movable coupling element (14) slideably accommodated in said guiding seat (15), a cylindrical helical spring (17) having one radial end (16) acting on said movable coupling element (14) and another radial end (19) acting on said rear wall of said guiding seat (15) for biasing said rear movable coupling element (14) in a direction extending in a straight line at right angles to the rotation axis of said pedal, a front wing (3) connected to said plate (2) and engaging said front fixed coupling element (11), a rear wing (4) connected to said plate (2) and engaging said rear movable coupling element (14).

2. Device according to claim 1, further comprising;
   a chamfer (20) defined by said movable coupling element (14) at a front upward region thereof, said chamfer engaging said rear wing (4) and moving said movable coupling element (14) backwards against said spring (17) upon a downward thrust of said rear wing (4),
   a recess (4b) defined between said sole (1) and said rear wing (4);
   a tooth (24) extending upwardly from said rear wing (4) in said recess (4b) and having an inclined side wall (23), and;
   at least one lateral chamfer (22) defined by said movable coupling element (14) for resting against said inclined side wall (23) of said tooth (24), said chamfer (20) and said lateral chamfer (22) generating a backward thrust component upon rotations of said sole (1) about an axis substantially perpendicular to said sole (1) for disengaging said rear wing (4) from said movable coupling element (14).

3. In combination, a bicycle pedal (8) having an axis of rotation, a shoe having a sole (1), and a device for fixing said sole (1) of said shoe to said bicycle pedal (8), said device comprising a plate (2) fixed to said sole (1), a front fixed coupling element (11) connected to said pedal (8), a guiding seat (15) defined in said pedal (8) and having a rear wall, a rear movable coupling element (14) located in said guiding seat (15), a cylindrical helical spring (17) having one radial end (16) pushing against said movable coupling element (14) and another radial end (19) pushing against said rear wall of said guiding seat (15) for biasing said rear movable coupling element (14) in a direction extending at right angles to said axis of rotation of said pedal, a front wing (3) connected to said plate (2) and releasably engaging said front fixed coupling element (11), a rear wing (4) connected to said plate (2) and releasably engaging said rear movable coupling element (14).

4. Device according to claim 3, further comprising;
a chamfer (20) defined by said movable coupling element (14) at a front upward region thereof, said chamfer engaging said rear wing (4) and moving said movable coupling element (14) backwards against said spring (17) upon a downward thrust of said rear wing (4),
a recess (4b) defined between said sole (1) and said rear wing (4);
a tooth (24) extending upwardly from said rear wing (4) in said recess (4b) and having an inclined side wall (23);
at least one lateral chamfer (22) defined by said movable coupling element (14) for resting against said inclined side wall (23) of said tooth (24), said chamfer (20) and said lateral chamfer (22) generating a backward thrust component upon rotations of said sole (1) about an axis substantially perpendicular to said sole (1) for disengaging said rear wing (4) from said movable coupling element (14).

5. In combination, a bicycle pedal (8) having an arcuately shaped upper surface (26), a shoe having a sole (1), and a device for fixing said sole (1) of said shoe to said bicycle pedal (8), said device comprising an arcuately shaped plate (2) fixed to said sole (1), a fixed coupling element (11) connected to said pedal (8), a seat (15) defined in said pedal (8) and having a wall, a movable coupling element (14) located in said seat (15), elastic biasing means (17) interposed between said movable coupling element (14) and said wall of said seat (15) for biasing said movable coupling element (14) in a linear direction extending towards said fixed coupling element, one wing (3) connected to said arcuately shaped plate (2) and releasably engaging said fixed coupling element (11), and another wing (4) connected to said arcuately shaped plate (2) and releasably engaging said movable coupling element (14) for releasably locking said arcuately shaped plate (2) in abutment with said arcuately shaped upper surface (26) of said pedal (8).

6. Combination according to claim 5, wherein said pedal (8) has an axis of rotation, and wherein said elastic biasing means comprise a spring (17) having one end (16) pushing against said movable coupling element (14) and another end (19) pushing against said wall of said seat (15) for biasing said movable coupling element (14) in a direction extending at right angles to said axis of rotation of said pedal.

7. Combination according to claim 5, further comprising a chamfer (20) defined by said movable coupling element (14), said chamfer engaging said other wing (4) and moving said movable coupling element (14) against elastic biasing action of said spring (17) upon thrusting said other wing (4) in a direction perpendicular to said movable coupling element (14).

8. Combination according to claim 7, further comprising a recess (4b) defined between said arcuately shaped plate (2) and said other wing (4).

9. Combination according to claim 8, further comprising a tooth (24) extending upwardly from said other wing (4) and being located within said recess (4b).

10. Combination according to claim 9, further comprising an inclined wall (23) defined on said tooth (24), and at least one lateral chamfer (22) defined by said movable coupling element (14) for resting against said inclined wall (23) of said tooth (24), said chamfer (20) and said lateral chamfer (22) generating a thrust component upon rotation of said sole (1) about an axis substantially perpendicular to said sole (1) for disengaging said other wing (4) from said movable coupling element (14).

11. In combination, a bicycle pedal (8) having an arcuately shaped upper surface (26) and an axis of rotation, a shoe having a sole (1), and a device for fixing said sole (1) of said shoe to said bicycle pedal (8), said device comprising an arcuately shaped plate (2) fixed to said sole (1), a fixed coupling element (11) connected to said pedal (8), a seat (15) defined in said pedal (8) and having a wall, a movable coupling element (14) located in said seat (15), spring (17) means defining one end (16) pushing against said movable coupling element (14) and another end (19) pushing against said wall of said seat (15) for biasing said movable coupling element (14) in a linear direction extending at right angles to said axis of rotation of said pedal, one wing (3) connected to said arcuately shaped plate (2) and releasably engaging said fixed coupling element (11), and another wing (4) connected to said arcuately shaped plate (2) and releasably engaging said movable coupling element (14) for releasably connecting said arcuately shaped plate (2) to said arcuately shaped upper surface (26) of said pedal (8).

12. Combination according to claim 11, further comprising a chamfer (20) defined by said movable coupling element (14), said chamfer engaging said other wing (4) and moving said movable coupling element (14) against elastic biasing action of said spring (17) upon thrusting said other wing (4) in a direction perpendicular to said movable coupling element (14).

13. Combination according to claim 12, further comprising a recess (4b) defined between said arcuately shaped plate (2) and said other wing (4).

14. Combination according to claim 13, further comprising a tooth (24) extending upwardly from said other wing (4) and being located within said recess (4b).

15. Combination according to claim 14, further comprising an inclined wall (23) defined on said tooth (24), and at least one lateral chamfer (22) defined by said movable coupling element (14) for resting against said inclined wall (23) of said tooth (24), said chamfer (20) and said lateral chamfer (22) generating a thrust component upon rotation of said sole (1) about an axis substantially perpendicular to said sole (1) for disengaging said other wing (4) from said movable coupling element (14).

* * * * *

UNITED STATES PATENT AND TRADEMARK OFFICE
CERTIFICATE OF CORRECTION

PATENT NO. : 5,377,561
DATED : January 3, 1995
INVENTOR(S) : Danieli et al

It is certified that error appears in the above-indentified patent and that said Letters Patent is hereby corrected as shown below:

On the cover sheet of the patent under Box (30) (Foreign Application Priority Data), please change the priority numbers "91A000153" and "91U000105" into --PD91A000153-- and --PD91U000105--, respectively.

Signed and Sealed this

Twenty-first Day of March, 1995

Attest:

BRUCE LEHMAN

*Attesting Officer*         *Commissioner of Patents and Trademarks*